United States Patent
Zaplana (10) Patent No.: US 10,797,609 B2
(45) Date of Patent: Oct. 6, 2020

(54) SYSTEMS AND METHODS FOR TRANSFERRING POWER ACROSS AN ISOLATION BARRIER USING AN ACTIVE SELF SYNCHRONIZED RECTIFIER

(71) Applicant: Analog Devices International Unlimited Company, Limerick (IE)

(72) Inventor: Ricardo Zaplana, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 26 days.

(21) Appl. No.: 16/286,318

(22) Filed: Feb. 26, 2019

(65) Prior Publication Data

US 2020/0274458 A1 Aug. 27, 2020

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0058* (2013.01)

(58) Field of Classification Search
CPC .......... H02M 3/335; H02M 3/00; H02M 3/07; H02M 3/158; H02M 3/155; H02M 3/1582; H02M 3/156; H02M 3/337; H02M 3/33507; H02M 3/33592; H02M 3/33576; H02M 3/33569; H02M 3/33546; H02M 3/33584; H02M 1/00; H02M 7/12; H02M 7/48; H02M 2001/0009; H02M 2001/0006
USPC ............................ 363/126, 21.06, 21.14, 127
See application file for complete search history.

(56) References Cited

U.S. PATENT DOCUMENTS

| | | | |
|---|---|---|---|
| 4,953,068 A | 8/1990 | Henze | |
| 5,781,419 A | 7/1998 | Kutkut et al. | |
| 5,870,299 A | 2/1999 | Rozman | |
| 5,907,481 A * | 5/1999 | Svardsjo | H02M 3/33592 363/25 |
| 5,991,167 A * | 11/1999 | Van Lerberghe | H02J 7/022 363/127 |
| 6,038,148 A * | 3/2000 | Farrington | H02M 1/38 363/127 |
| 6,069,799 A | 5/2000 | Bowman et al. | |

(Continued)

FOREIGN PATENT DOCUMENTS

| | | |
|---|---|---|
| CN | 1182649 C | 12/2004 |
| CN | 101378232 A | 3/2009 |

(Continued)

OTHER PUBLICATIONS

US 7,630,213 B2, 12/2009, Chen et al. (withdrawn)

(Continued)

*Primary Examiner* — Thienvu V Tran
*Assistant Examiner* — Nusrat Quddus
(74) *Attorney, Agent, or Firm* — Wolf, Greenfield & Sacks, P.C.

(57) ABSTRACT

Systems and methods for transferring power across an isolation barrier using an active self-synchronized rectifier are described. A rectifier as described herein may provide DC to DC power conversion with high efficiency. Furthermore, by using a microfabricated transformer or microfabricated capacitor as an isolation component, an isolation component and rectifier may be microfabricated and implemented on chip.

20 Claims, 5 Drawing Sheets

(56) References Cited

U.S. PATENT DOCUMENTS

| | | | |
|---|---|---|---|
| 6,104,623 | A | 8/2000 | Rozman |
| 6,130,828 | A | 10/2000 | Rozman |
| 6,256,214 | B1 | 7/2001 | Farrington et al. |
| 6,288,920 | B1 | 9/2001 | Jacobs et al. |
| 6,538,905 | B2 | 5/2003 | Greenfeld et al. |
| 6,819,574 | B2 | 11/2004 | Xu et al. |
| 6,944,033 | B1 | 9/2005 | Xu et al. |
| 7,489,526 | B2 | 2/2009 | Chen et al. |
| 7,548,440 | B2 | 6/2009 | Chen et al. |
| 7,558,080 | B2 | 7/2009 | Chen et al. |
| 7,613,016 | B2 | 11/2009 | Chen et al. |
| 7,706,154 | B2 | 4/2010 | Chen et al. |
| 7,983,059 | B2 | 7/2011 | Chen |
| 8,797,773 | B2 | 8/2014 | George |
| 10,068,702 | B2 | 9/2018 | Posat et al. |
| 2006/0109698 | A1* | 5/2006 | Qu .................... H02M 3/33592 363/127 |
| 2011/0199012 | A1* | 8/2011 | Lai ..................... H05B 41/282 315/219 |
| 2013/0062962 | A1* | 3/2013 | Xue ....................... H02J 5/005 307/104 |
| 2018/0278169 | A1* | 9/2018 | Jitaru ................ H02M 3/33592 |
| 2018/0316388 | A1* | 11/2018 | Lee ......................... H04B 5/02 |

FOREIGN PATENT DOCUMENTS

| | | |
|---|---|---|
| CN | 101488715 A | 7/2009 |
| CN | 102064702 A | 5/2011 |
| CN | 102201739 A | 9/2011 |
| CN | 102801327 A | 11/2012 |
| WO | WO 01/52394 A2 | 7/2001 |
| WO | WO 2008/041399 A1 | 4/2008 |

OTHER PUBLICATIONS

[No Author Listed], Implementing a Digital AC/DC Switched-Mode Power Supply using a 56F8300 Digital Signal Controller. Freescale Semiconductor. Application Note AN3115. 2005; 24 pages.

[No Author Listed], Phase-Shifted Full Bridge DC/DC Power Converter Design Guide. Texas Instruments. TIDU248. May 2014; 56 pages.

[No Author Listed], Synchronous Phase Modulated Full-Bridge Controller. Linear Technology. LTC1922-1. 2000; 24 pages.

[No Author Listed], ZVS DC/DC Power Supply with Synchronous Rectifiers Evaluation Board. Renesas User's Manual. ISL6752/54EVAL1Z. May 25, 2018; 33 pages.

Liu et al., The Implementation of a Full-Bridge Phase-Shifted Zero-Voltage-Switching Power Converter. PEDS2009. IEEE. Nov. 2-5, 2009; 1173-1177.

Panov et al., Design and Performance Evaluation of Low-Voltage/High-Current DC/DC On-Board Modules. IEEE Transactions on Power Electronics. Jan. 2001; 16(1):26-33.

Rao et al., How to achieve low radiated emissions with fully integrated data and power isolation. EDN Network. Mar. 22, 2017; 14 pages.

Sterk, Compact Isolated High Frequency DC/DC Converters Using Self-Driven Synchronous Rectification. Masters of Science in Electrical Engineering Thesis. Virginia Polytechnic Institute. Dec. 17, 2003; 101 pages.

Wang et al., Design and Implementation of a Digitally-Controlled Phase-Shift Full-Bridge Converter with Output Synchronous Rectifier and Current Doubler. Journal of Technology. 2017; 32(4):283-297.

Zwicker et al., How It Works: The Current Double Demystified. How2Power Today. Feb. 2016; 4 pages.

* cited by examiner

SYSTEMS AND METHODS FOR TRANSFERRING POWER ACROSS AN ISOLATION BARRIER USING AN ACTIVE SELF SYNCHRONIZED RECTIFIER

FIELD OF THE DISCLOSURE

The present disclosure relates to galvanic isolation systems and methods.

BACKGROUND

Galvanic isolation between circuit components and transmission of data and power across an isolation barrier is often provided for safety and/or data integrity considerations. In some cases, an isolation barrier may prevent current flow between functional circuit components on opposing sides of the barrier while nonetheless allowing the exchange of energy or information across the barrier via components such as via transformers or capacitors or by optical means. Galvanic isolation is sometimes used to isolate circuits operating in different voltage domains. Galvanic isolation is sometimes used to isolate circuits referenced to different electric potentials.

SUMMARY OF THE DISCLOSURE

Systems and methods for transferring power across an isolation barrier using an active self-synchronized rectifier are described. A rectifier as described herein may provide DC to DC power conversion with high efficiency. Furthermore, by using a microfabricated transformer or microfabricated capacitor as an isolation component, an isolation component and rectifier may be microfabricated and implemented on chip.

According to some embodiments, a circuit for transferring power across an isolation barrier is provided, the circuit comprising a first DC output terminal, a second DC output terminal, and a rectifier comprising an isolation component having a first terminal and a second terminal, a first active device coupled between the first terminal of the isolation component and the first DC output terminal, a second active device coupled between the second terminal of the isolation component and the first DC output terminal, a third active device coupled between the first terminal of the isolation component and the second DC output terminal, a fourth active device coupled between the second terminal of the isolation component and the second DC output terminal, a first inductor coupled between the first and second active devices and the first DC output terminal, and a second inductor coupled between the third and fourth active devices and the second DC output terminal.

According to some embodiments, a method of transferring DC power across an isolation barrier is provided, the method comprising providing a first DC signal across first and second DC input terminals, and producing a second DC signal across first and second DC output terminals, wherein the first and second DC input terminals and the first and second DC output terminals are coupled to a rectifier comprising an isolation component having a first terminal and a second terminal, a first active device coupled between the first terminal of the isolation component and the first DC output terminal, a second active device coupled between the second terminal of the isolation component and the first DC output terminal, a third active device coupled between the first terminal of the isolation component and the second DC output terminal, a fourth active device coupled between the second terminal of the isolation component and the second DC output terminal, a first inductor coupled between the first and second active devices and the first DC output terminal, and a second inductor coupled between the third and fourth active devices and the second DC output terminal.

According to some embodiments, an isolated DC-DC converter is provided, comprising an isolator having a primary side isolation component and a secondary side isolation component, a full bridge active self-synchronized rectifier comprising a plurality of switches arranged in a cross-coupled configuration and coupled to the secondary side isolation component, a first inductor coupled between the rectifier and a first output terminal of the DC-DC converter, and a second inductor coupled between the rectifier and a second output terminal of the DC-DC converter.

BRIEF DESCRIPTION OF THE DRAWINGS

Various aspects and embodiments of the application will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

The inventor has developed systems and methods for rectifying an alternating current (AC) signal received across an isolation barrier using an active self-synchronized rectifier. A rectifier as described herein uses an isolator (e.g., a transformer or capacitor) to resonate with active devices in the rectifier, which produces self-synchronous behavior and AC to DC power conversion with high efficiency. The active devices in the rectifier may be arranged in a full bridge configuration. According to an embodiment of the application, the active devices may include four cross-coupled switches (e.g., transistors). Furthermore, the rectifier may be microfabricated and implemented on chip in some embodiments, which may provide for a rectifier with a smaller area than in conventional approaches.

Conventional rectifiers are typically formed by a plurality of diodes. For instance, isolated DC-DC converters may provide DC to AC conversion on a primary side, and diodes on the secondary side of the isolator to rectify an AC voltage as part of an AC to DC converter. The inventor has recognized and appreciated that the power transfer efficiency of such an approach may be less-than-optimal as a result of power being dissipated through the diodes, and may require a complex driver circuit on the primary side to drive the transformer in the correct manner for power transfer. Moreover, while it may be possible to microfabricate some portions of a rectifier, there may be portions which cannot be microfabricated. Thus, a rectifier may consume a greater footprint than desired.

Aspects of the present application may provide a resonating isolated DC-DC converter. Transmitting DC power through an isolation barrier may comprise converting a DC signal to an AC signal via a DC to AC converter on one side of the barrier, transferring the AC signal across the barrier, and converting an AC signal to a DC signal via a self-synchronized active rectifier on the other side of the barrier. The isolator transferring signals across the barrier may, for instance, be a transformer-based isolator or a capacitor-based isolator.

Figure 1:
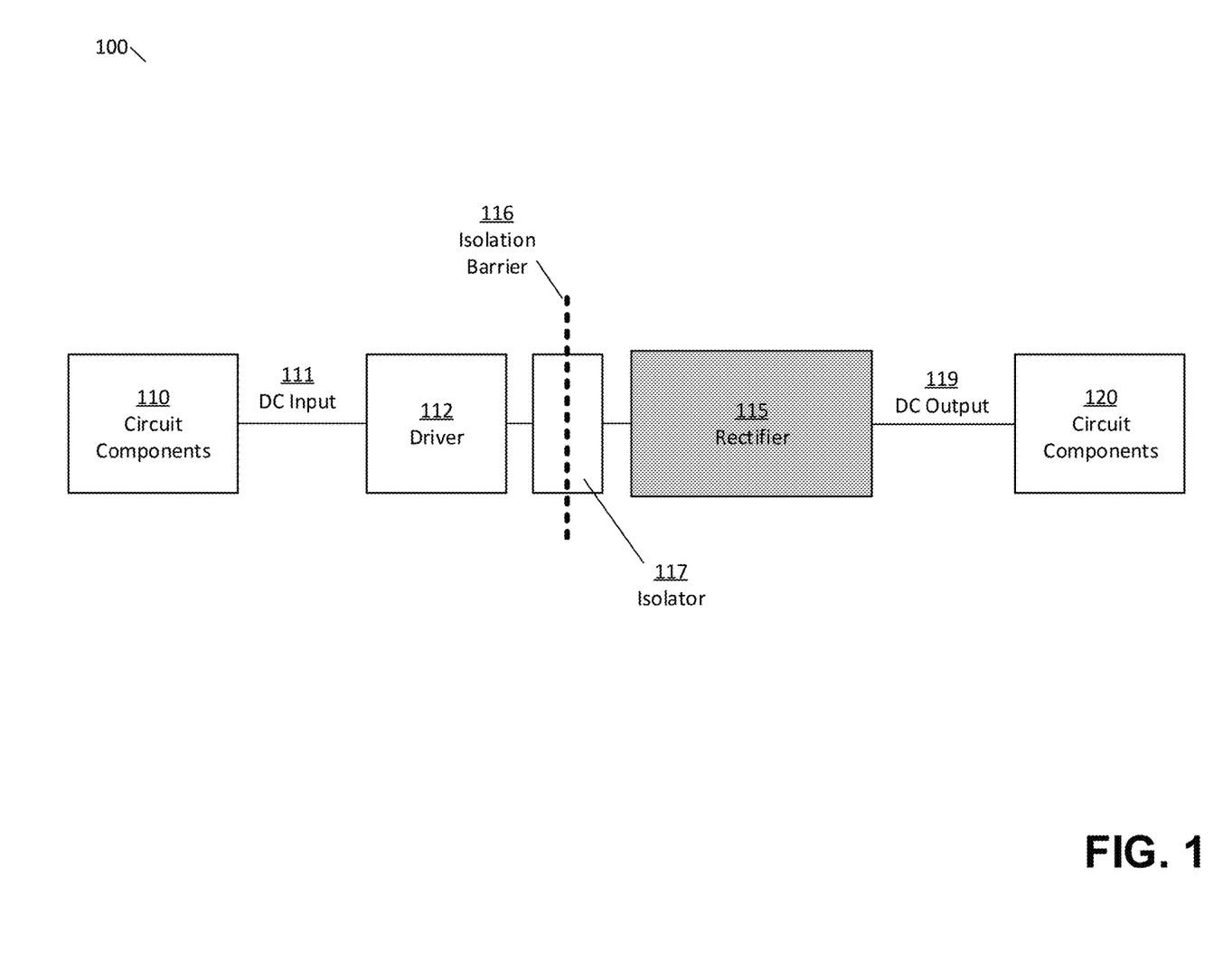
FIG. 1 depicts a block diagram of a resonating isolated DC-DC converter, according to some embodiments.

FIG. 1 depicts an illustrative circuit in which a rectifier as described herein may be implemented and used as part of a DC-DC converter, according to some embodiments. In the example of circuit 100, circuit components 110 are galvanically isolated from circuit components 120 via an isolation barrier 116, which is part of the isolator 117. The isolator 117, which may be an isolator, is coupled to rectifier 115, which is coupled to circuit components 120 via a DC output 119. A driver 112 receives a DC input signal from the circuit components 110 and produces an AC signal within the isolator on one side of the barrier, and thereby produces an AC signal within the isolator on the other side of the barrier, which is coupled to the rectifier circuit. For example, the isolator may be a transformer and the driver may produce an AC signal in one coil of the transformer thereby inducing an AC signal in the other coil of the transformer. Any suitable driver which generates an AC signal based on a DC signal may be used as driver 112.

According to some embodiments, the isolator 117 may comprise a transformer and/or a capacitor, which may include a microfabricated transformer and/or microfabricated capacitor. In some embodiments, rectifier 115 may be microfabricated on chip; in such cases, any of the circuit components 120 may also be microfabricated with the rectifier on the same chip. In some cases, the isolator 117 (or at least part of the isolator) may also be fabricated on chip. In some cases, the circuit components 110, the circuit components 120 and the rectifier 115 may each be microfabricated on a respective chip. Alternatively, the circuit components 110 and the rectifier 115 may be fabricated on the same chip with circuit components 120 being fabricated on a separate chip. Alternatively, the circuit components 120 and the rectifier 115 may be fabricated on the same chip with circuit components 110 being fabricated on a separate chip.

According to some embodiments, rectifier 115 may be operated to receive AC signals at frequencies of 1 MHz or greater, or at frequencies of 10 MHz or greater, or at frequencies of 100 MHz or greater, and may be operated at frequencies of 1 GHz or lower, or at frequencies of 100 MHz or lower, or at frequencies of 10 MHz or lower. For instance, a given rectifier 115 may be operable to receive AC signals of frequencies between 10 MHz and 100 MHz.

In some embodiments, excess power at the DC output 119 may be provided to the DC input 111 via a feedback circuit. In some embodiments, a series capacitance with driver 112 may be included, which may resonate with the isolator 117 and the parasitic capacitance of the rectifier 115.

Figure 2A:
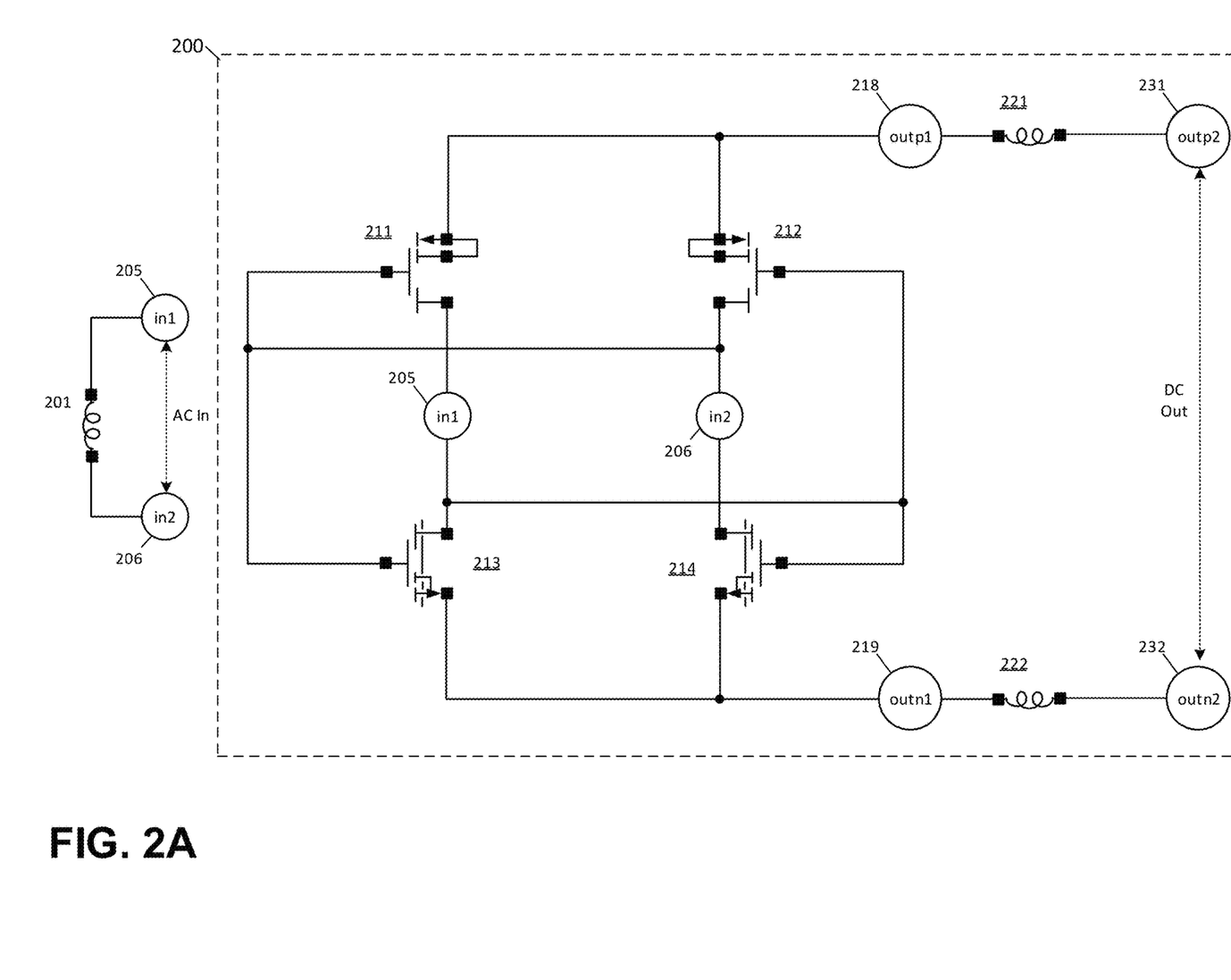
FIG. 2A depicts a rectifier circuit, according to some embodiments.

FIG. 2A depicts a rectifier circuit, according to some embodiments. In the example of FIG. 2A, an inductor 201 which is part of an isolator is shown and is coupled to rectifier circuit 200 via terminals 205 ("in1") and 206 ("in2"). In operation, the inductor 201 may output an AC current in response to an AC current being generated in another inductor on the other side of the isolation barrier (not shown in FIG. 2A). In circuit rectifier 200, the terminals 205 and 206 of the isolator are coupled to active devices 211, 212, 213 and 214.

Figure 2B:
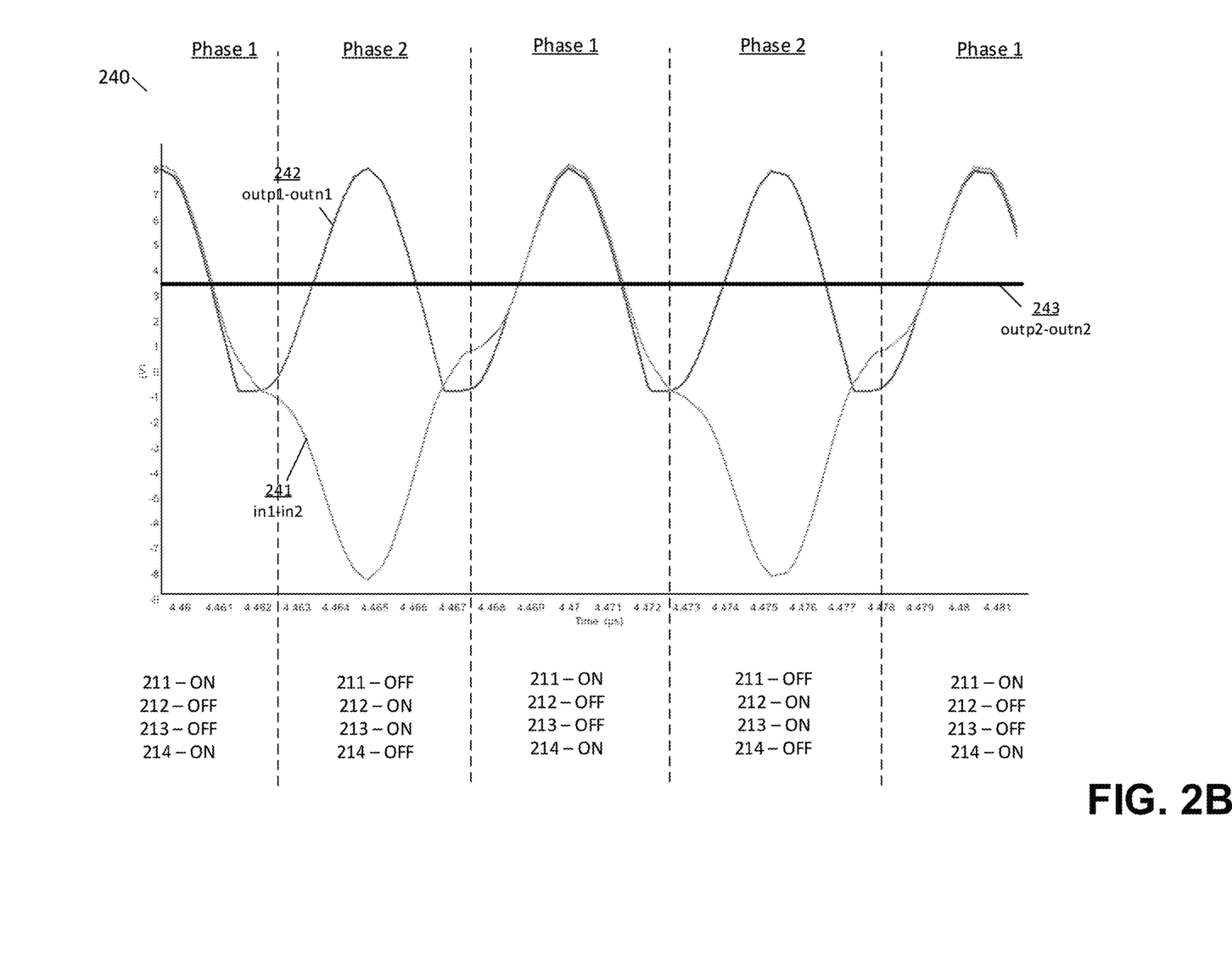
FIG. 2B depicts voltages over time across three different points of the circuit shown in FIG. 2A, according to some embodiments.
Figure 2C:
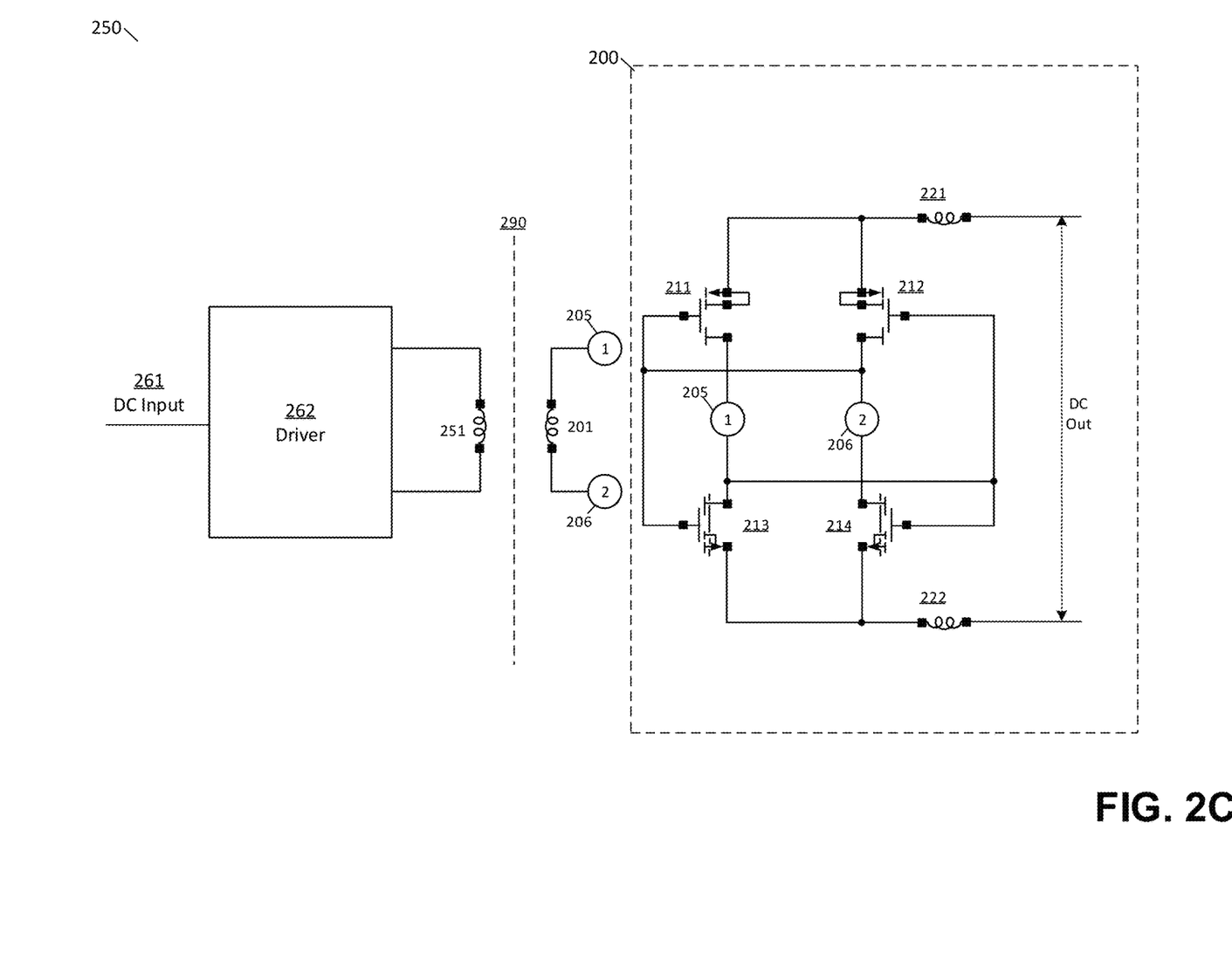
FIG. 2C depicts a circuit diagram of an example isolated DC-DC converter, according to some embodiments.

In the example of FIGS. 2A-2C, the active devices are metal oxide semiconductor field effect transistors (MOSFETs), with FETs 211 and 212 being PMOS transistors and FETs 213 and 214 being NMOS transistors. In the circuit 200, the FETs operate as switches, and the four FETs are arranged in a cross-coupled configuration. Each terminal of the inductor 201 is connected to one of the two gates of each transistor pair (transistors 211 and 212 being one pair and transistors 213 and 214 being another pair). That is, in1 is connected to the gate of transistor 214 and in2 is connected to the gate of transistor 213; similarly, in1 is connected to the gate of transistor 212 and in2 is connected to the gate of transistor 211. This arrangement causes opposing activation and deactivation of the transistors within each pair; as one transistor of the pair is active the other is inactive, and vice versa. The resulting voltage across the points of the circuit 218 ("outp1") and 219 ("outn1") is thereby rectified. This signal still contains oscillations, however, and the inductors 221 and 222 serve to smooth the signal to produce a net DC signal. In particular, inductors 221 and 222 may provide a high impedance to the AC signal, which thereby confines the AC energy within the resonator to achieve a high conversion efficiency.

It should be appreciated that FETs represent a non-limiting example of transistor switch technology, and that other types of transistors may be employed in the same configuration as that shown. Furthermore, it will be appreciated that, in an alternate configuration, the FETs 211 and 212 may be NMOS transistors and the FETs 213 and 214 PMOS transistors.

The aforementioned voltages are depicted in FIG. 2B, which illustrates a voltage over time across three different points of the circuit 200. The signal 241 is an input AC signal across the inductor 201 (i.e., across 205/206); signal 242 is a rectified signal across the points of the circuit 218 ("outp1") and 219 ("outn1"); and signal 243 is a DC signal across the points of the circuit 231 ("outp2") and 232 ("outn2"). Temporal phases in which the transistors are activated and deactivated are shown, with phase 1 being identified as a period in which transistors 211 and 214 are active and transistors 212 and 213 are inactive, and phase 2 being a period in which transistors 212 and 213 are active and transistors 211 and 214 are inactive.

It will be appreciated that the rectifier circuit 200 may be used with any suitable isolator and primary side driver circuit, as the various aspects are not limited in this respect.

A DC-DC converter including rectifier circuit 200 is shown in FIG. 2C, according to some embodiments. The illustrated rectifier circuit 200 may operate as a full bridge isolated resonating AC-DC converter. In FIG. 2C, rectifier circuit 200 is coupled across isolation barrier 290 to a driver 262. The driver 262 in the example of FIG. 2C receives a DC input signal 261 and produces an AC signal at inductor 251.

According to some embodiments, circuit 250 may, in operation, transfer power across the isolation barrier at AC frequencies of 1 MHz or greater, or at frequencies of 10 MHz or greater, or at frequencies of 100 MHz or greater. With the illustrative voltages of FIG. 2B, for instance, the AC signal 241 is depicted at a frequency of approximately 10 MHz (with a period of approximately 0.01 microseconds). Operation at high frequencies may facilitate microfabrication of the transformer of the isolation barrier, in addition to improving efficiency of the transformer. Furthermore, at high frequencies the inductors 221, 222, 271 and 272 may have a small inductance, which also allows these components to be microfabricated. For instance, the inductors 201, 221, 222, and 251 may each have an inductance of less than 10 nH, or less than 5 nH, or less than 2 nH.

The rectifiers and isolated DC-DC converters described herein may be used in various applications. For example, automotive, consumer electronics, industrial, and healthcare applications may all make use of the technology described herein.

Figure 3:
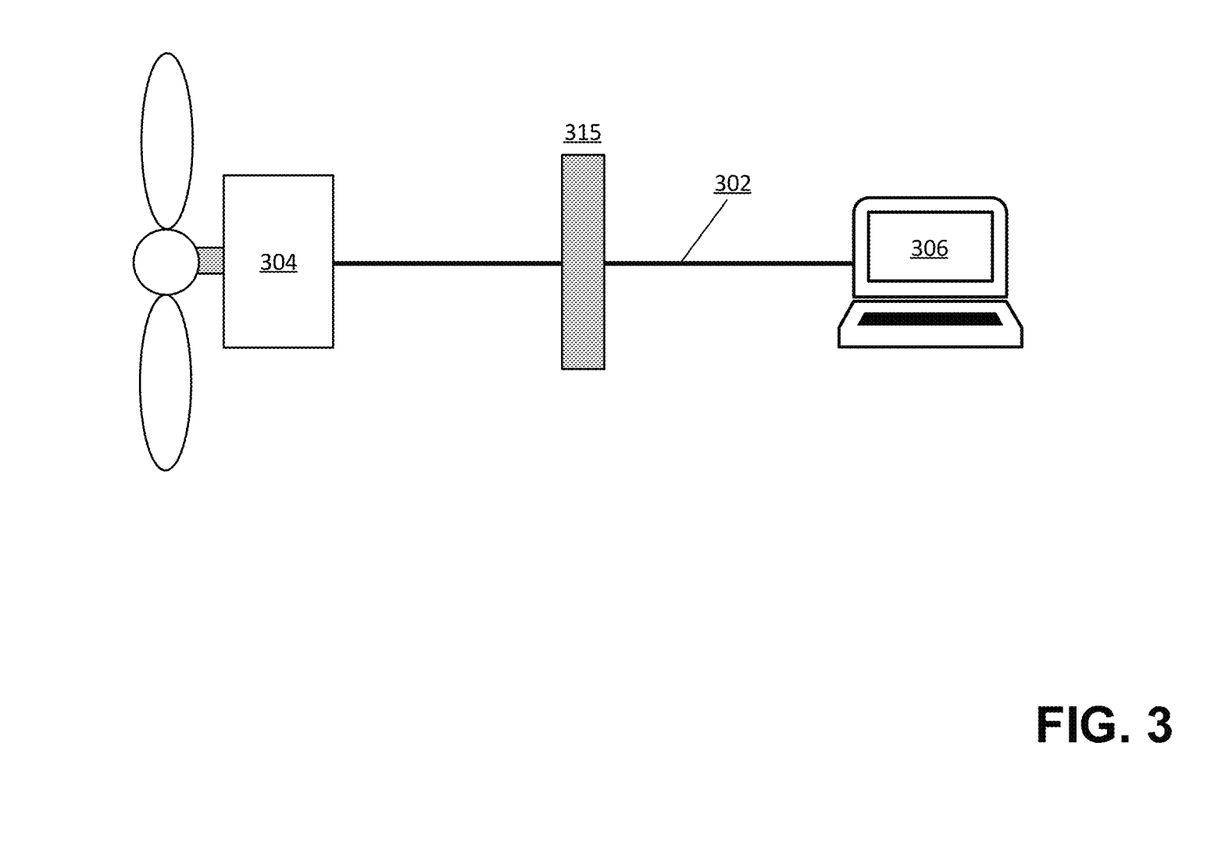
FIG. 3 is a schematic diagram showing an exemplary application of an apparatus in an industrial communication link, according to some embodiments.

FIG. 3 is a schematic diagram showing an exemplary application of an apparatus in an industrial communication link, according to some embodiments. An isolated DC-DC converter 315 having a self-synchronized rectifier of the types described herein may be used in an industrial communication link 302 to isolate a comparatively high voltage device from a comparatively low voltage device. In the example of FIG. 3, the communication link 302 is between a turbine 304 and a computing device 306. The computing device 304 may for instance be a personal computer (PC), a server, a smartphone, a personal digital assistance (PDA), a tablet, or another computing device. Other such devices may also make use of DC-DC converters of the types described herein. Although the DC-DC converter 315 is depicted along the communication link 302 between the turbine 304 and computing device 306, the converter 315 may be in practice arranged in either the turbine or the computing device instead of as a separate component along the communication link 302.

While FIG. 3 illustrates an example of an industrial communication link incorporating aspects of the present application, other uses are possible. For example, one or more isolated DC-DC converter devices may be employed in an automobile (e.g., within a CAN transceiver) or a medical instrument. Various embodiments of the present application may be implemented to provide high compact, cost-effective DC to DC power conversion.

The various aspects described herein may provide various benefits. Some such benefits have been described previously herein. Not all embodiments provide every benefit, and benefits other than those listed may be provided. In some embodiments, an isolated DC-DC converter is provided with a simplified circuit design. The simplified circuit design may save space on a printed circuit board and/or reduce manufacturing costs by using a common isolator to transfer power and feedback signals. Some embodiments may provide improved power efficiency and/or isolating ratings over a conventional isolated DC-DC converter, at least in part due to the techniques described herein allowing for operation of the converter at high frequencies (e.g., >10 MHz). Some embodiments may provide for a simple control structure compared with a conventional isolated DC-DC converter by being self-synchronized. In some embodiments, a rectifier as described herein may be fabricated using a standard silicon process.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A circuit for transferring power across an isolation barrier, the circuit comprising:
   a first DC output terminal;
   a second DC output terminal; and
   a rectifier comprising:
      an isolation component having a first terminal and a second terminal;
      a first active device coupled between the first terminal of the isolation component and the first DC output terminal;
      a second active device coupled between the second terminal of the isolation component and the first DC output terminal;
      a third active device coupled between the first terminal of the isolation component and the second DC output terminal;
      a fourth active device coupled between the second terminal of the isolation component and the second DC output terminal;
      a first inductor coupled between the first and second active devices and the first DC output terminal; and
      a second inductor coupled between the third and fourth active devices and the second DC output terminal.

2. The circuit of claim 1, wherein the first and second active devices are MOSFETs, a gate of the first active device is connected to the first terminal of the isolation component, and a gate of the second active device is connected to the second terminal of the isolation component.

3. The circuit of claim 2, wherein the third and fourth active devices are MOSFETs, a gate of the third active device is connected to the first terminal of the isolation component, and a gate of the fourth active device is connected to the second terminal of the isolation component.

4. The circuit of claim 3, wherein the first and second active devices are PMOS transistors, and wherein the third and fourth active devices are NMOS transistors.

5. The circuit of claim 3, wherein:
   a source of the first active device is connected to the second terminal of the isolation component,
   a source of the second active device is connected to the first terminal of the isolation component,
   a source of the third active device is connected to the second terminal of the isolation component, and
   a source of the fourth active device is connected to the first terminal of the isolation component.

6. The circuit of claim 1, wherein the isolation component comprises a micro-transformer.

7. The circuit of claim 1, wherein the isolation component comprises a micro-capacitor.

8. The circuit of claim 1, wherein:
   the isolation component is a first isolation component,
   the isolator comprises a second isolation component across the isolation barrier from the first isolation component, the second isolation component comprising a third terminal and a fourth terminal, and
   the circuit further comprises a driver coupled to the third terminal and fourth terminal.

9. The circuit of claim 1, wherein the rectifier is fabricated on chip.

10. The circuit of claim 1, wherein the first and second inductors each have an inductance between 1 nH and 10 nH.

11. The circuit of claim 1, wherein, in a first state, an AC voltage applied across the first terminal and second terminal of the isolation component activates the first active device and the fourth active device, and wherein, in a second state, the AC voltage applied across the first terminal and second terminal of the isolation component activates the second active device and the third active device.

12. A method of transferring DC power across an isolation barrier, the method comprising:
    providing a first DC signal across first and second DC input terminals; and
    producing a second DC signal across first and second DC output terminals,
    wherein the first and second DC input terminals and the first and second DC output terminals are coupled to a rectifier comprising:
        an isolation component having a first terminal and a second terminal;
        a first active device coupled between the first terminal of the isolation component and the first DC output terminal;
        a second active device coupled between the second terminal of the isolation component and the first DC output terminal;
        a third active device coupled between the first terminal of the isolation component and the second DC output terminal;
        a fourth active device coupled between the second terminal of the isolation component and the second DC output terminal;
        a first inductor coupled between the first and second active devices and the first DC output terminal; and
        a second inductor coupled between the third and fourth active devices and the second DC output terminal.

13. The method of claim 12, wherein the first and second active devices are MOSFETs, a gate of the first active device is connected to the first terminal of the isolation component, and a gate of the second active device is connected to the second terminal of the isolation component.

14. The method of claim 13, wherein the third and fourth active devices are MOSFETs, a gate of the third active device is connected to the first terminal of the isolation component, and a gate of the fourth active device is connected to the second terminal of the isolation component.

15. The method of claim 14, wherein the first and second active devices are PMOS transistors, and wherein the third and fourth active devices are NMOS transistors.

16. An isolated DC-DC converter, comprising:
    an isolator having a primary side isolation component and a secondary side isolation component;
    a full bridge active self-synchronized rectifier comprising a plurality of switches arranged in a cross-coupled configuration and coupled to the secondary side isolation component;
    a first inductor coupled between the rectifier and a first output terminal of the DC-DC converter; and
    a second inductor coupled between the rectifier and a second output terminal of the DC-DC converter.

17. The isolated DC-DC converter of claim 16, wherein the isolator, the rectifier, the first inductor and the second inductor are microfabricated on chip.

18. The isolated DC-DC converter of claim 16, wherein the isolator comprises a micro-transformer.

19. The isolated DC-DC converter of claim 16, wherein the plurality of switches are MOSFETs.

20. The isolated DC-DC converter of claim 16, wherein the first and second inductors each have an inductance between 1 nH and 10 nH.

* * * * *